United States Patent
Ho et al.

(10) Patent No.: US 10,639,991 B2
(45) Date of Patent: May 5, 2020

(54) VEHICLE TRAVELING SUPPORT CONTROL APPARATUS

(71) Applicant: MITSUBISHI JIDOSHA KOGYO KABUSHIKI KAISHA, Tokyo (JP)

(72) Inventors: Shien Ho, Tokyo (JP); Yoshitaka Yahata, Tokyo (JP); Daisuke Sugiyama, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/386,770

(22) Filed: Dec. 21, 2016

(65) Prior Publication Data
US 2017/0174080 A1    Jun. 22, 2017

(30) Foreign Application Priority Data
Dec. 22, 2015 (JP) ................ 2015-250391

(51) Int. Cl.
| | | |
|---|---|---|
| *B60K 31/00* | (2006.01) | |
| *G08G 1/0962* | (2006.01) | |
| *B60W 50/14* | (2020.01) | |
| *B60K 35/00* | (2006.01) | |
| *B60W 50/00* | (2006.01) | |

(52) U.S. Cl.
CPC ........... *B60K 31/00* (2013.01); *B60W 50/14* (2013.01); *G08G 1/09626* (2013.01); *B60K 35/00* (2013.01); *B60K 2031/0025* (2013.01); *B60K 2370/161* (2019.05);
(Continued)

(58) Field of Classification Search
None
See application file for complete search history.

(56) References Cited

U.S. PATENT DOCUMENTS

2016/0107644 A1* 4/2016 Eigel ................ B60W 50/14
701/70

FOREIGN PATENT DOCUMENTS

| | | |
|---|---|---|
| DE | 10 2010 047 411 A1 | 5/2011 |
| DE | 10 2010 009 133 A1 | 8/2011 |
(Continued)

OTHER PUBLICATIONS

Extended European Search Report dated May 19, 2017 in corresponding European Application No. 16205893.7.
(Continued)

*Primary Examiner* — Christian Chace
*Assistant Examiner* — Kyung J Kim
(74) *Attorney, Agent, or Firm* — Birch, Stewart, Kolasch & Birch, LLP

(57) ABSTRACT

A vehicle traveling support control apparatus includes a traveling environment determining portion that determines a traveling environment of a vehicle, a support device determining portion that determines a serviceable traveling support device from one or more traveling support devices mounted in the vehicle in accordance with the traveling environment determined by the traveling environment determining portion, a presentation portion that presents support guidance of the serviceable traveling support device, and a control portion that controls the presentation portion to present the support guidance of the serviceable traveling support device based on use frequency of the serviceable traveling support device determined by the support device determining portion.

9 Claims, 8 Drawing Sheets

(52) U.S. Cl.
CPC .............. *B60W 2050/0088* (2013.01); *B60W 2050/0089* (2013.01); *B60W 2530/145* (2013.01); *B60W 2530/18* (2013.01)

(56) References Cited

FOREIGN PATENT DOCUMENTS

| | | |
|---|---|---|
| DE | 10 2012 202 551 A1 | 9/2012 |
| DE | 10 2012 011 148 A1 | 12/2013 |
| EP | 1 418 476 A1 | 5/2004 |
| JP | 2008-305319 A | 12/2008 |
| JP | 2015-207253 A | 11/2015 |

OTHER PUBLICATIONS

Japanese Office Action, dated Nov. 5, 2019, for Japanese Application No. 2015-250391, along with an English translation.

* cited by examiner

FIG. 2A

| TRAVELING ENVIRONMENT DETERMINATION CONDITIONS |
|---|
| • TRAVELING PLACE (TOLL ROAD/ URBAN AREA)<br>• ROAD ENVIRONMENT<br>(NATIONAL ROAD/PREFECTURAL ROAD/MUNICIPAL ROAD)<br>• ROAD SHAPE (STRAIGHT LINE/CURVE/BRANCH/TUNNEL)<br>• TRAFFIC JAM STATE (PRESENT/ABSENT)<br>• WEATHER CONDITION (SUNNY/RAINY/SNOWY) |

FIG. 2B

| DETECTED TRAVELING ENVIRONMENT CONDITIONS | SERVICEABLE TRAVELING SUPPORT DEVICE |
|---|---|
| • TRAVELING PLACE (TOLL ROAD)<br>• ROAD ENVIRONMENT<br>(NATIONAL ROAD)<br>• ROAD SHAPE (STRAIGHT LINE)<br>• TRAFFIC JAM STATE (ABSENT)<br>• WEATHER CONDITION (SUNNY) | • ACC CONTROL DEVICE |

VEHICLE TRAVELING SUPPORT CONTROL APPARATUS

CROSS REFERENCE TO RELATED APPLICATION

This application is based on Japanese Patent Application No. 2015-250391 filed on Dec. 22, 2015, the contents of which are incorporated herein by reference.

BACKGROUND OF THE INVENTION

1. Technical Field

The present invention relates to a vehicle traveling support control apparatus.

2. Background Art

Some vehicles are mounted with traveling support devices for supporting travelling in accordance with travelling environments. Each vehicle is mounted with one or more traveling support devices and often arranged so that the traveling support devices can be actuated by setting operation made by a driver himself/herself.

When driving such vehicles mounted with traveling support devices, many drivers cannot thoroughly understand what kinds of traveling support devices are mounted in the vehicles the drivers are driving. Therefore, there has been proposed an invention which can make control to properly guide a traveling support device suitable for a traveling environment (e.g. JP-A-2008-305319).

According to JP-A-2008-305319, a traveling support device suitable for the traveling environment is properly guided. However, some driver does not use a traveling support device (traveling support function) though it is guided, while selecting and using another traveling support device himself/herself though it is not guided. For this reason, guidance simply suitable for the traveling environment hardly leads to guidance corresponding to driver's use frequency.

An object of the invention is to guide a traveling support device suitably for a traveling environment and in consideration of driver's use frequency to thereby improve drivability.

SUMMARY OF THE INVENTION

According to the invention, there is provided a vehicle traveling support control apparatus including: a traveling environment determining portion which is mounted in a vehicle and which determines a traveling environment of the vehicle; a support device determining portion which determines a serviceable traveling support device from one or more traveling support devices mounted in the vehicle in accordance with the traveling environment determined by the traveling environment determining portion; a presentation portion which presents support guidance of the serviceable traveling support device; and a control portion which controls the presentation portion to present the support guidance of the serviceable traveling support device based on use frequency of the serviceable traveling support device determined by the support device determining portion.

According to the invention, the support guidance of the serviceable traveling support device is presented by the presentation portion based on the use frequency of the serviceable traveling support device determined by the support device determining portion. Accordingly, it is possible to guide the traveling support device suitably for the traveling environment and in consideration of the driver's use frequency to thereby improve drivability.

BRIEF DESCRIPTION OF DRAWINGS

FIG. 2A is a view showing examples of conditions for determining a travelling environment of a vehicle, and FIG. 2B is a view showing detected traveling environment conditions and a serviceable traveling support device.

DESCRIPTION OF PREFERRED EMBODIMENT

An embodiment of the invention will be described below with reference to the drawings.

Figure 1:
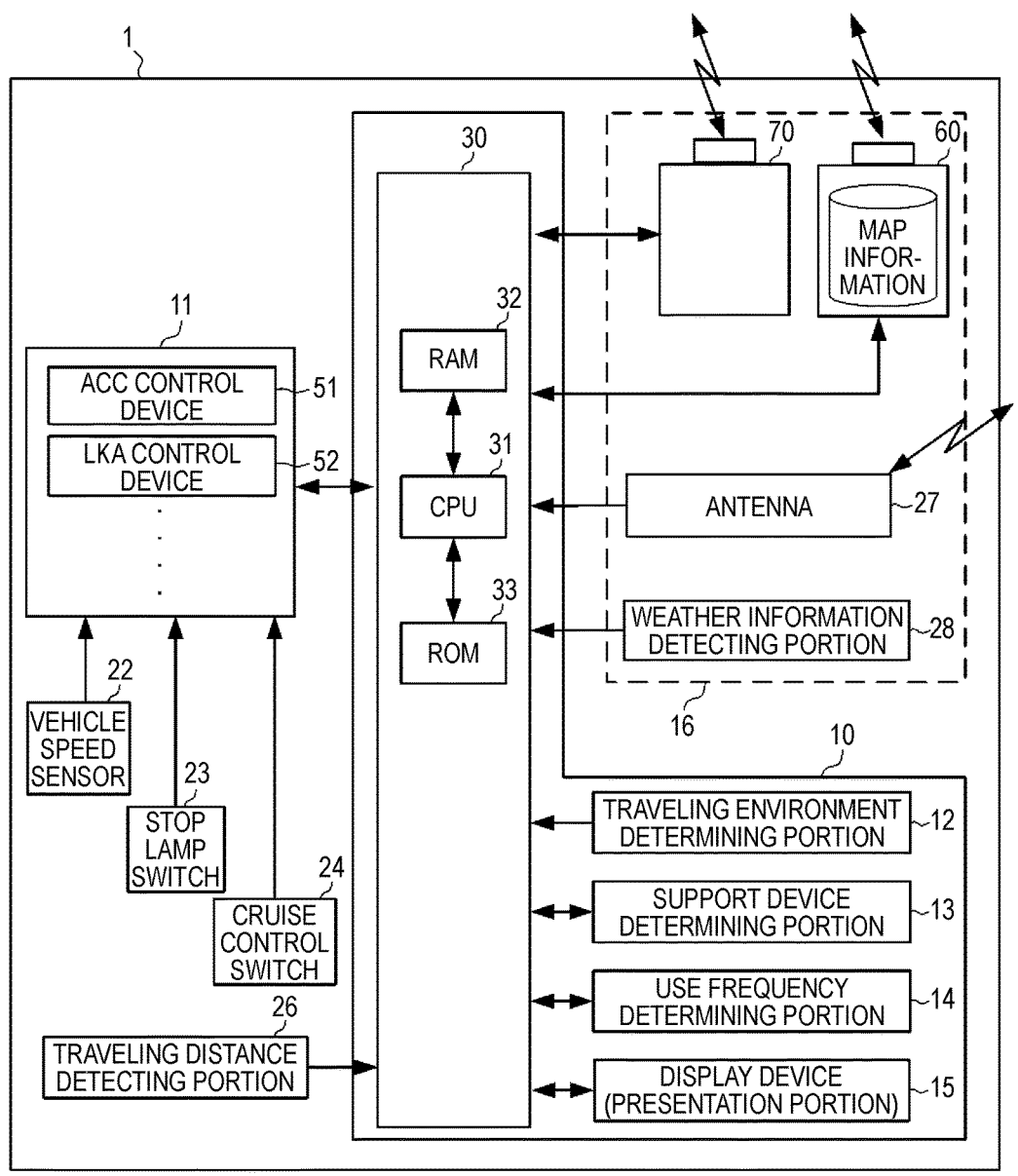
FIG. 1 is a block diagram showing the functional configuration of a vehicle traveling support control apparatus according to an embodiment of the invention.

FIG. 1 is a block diagram showing the functional configuration of a vehicle traveling support control apparatus 10. The vehicle traveling support control apparatus 10 presents, to a driver, support guidance of one or more traveling support devices 11 mounted in a vehicle 1 in accordance with a traveling environment of the vehicle 1 and driver's use frequency.

To this end, the vehicle traveling support control apparatus 10 includes a traveling environment determining portion 12, a support device determining portion 13, a use frequency determining portion 14, a display device 15, and a control portion 30. The traveling environment determining portion 12 determines the traveling environment of the vehicle 1. The support device determining portion 13 determines a serviceable traveling support device from the one or more travelling support devices 11 mounted in the vehicle 1 in accordance with the traveling environment determined by the traveling environment determining portion 12. The use frequency determining portion 14 determines use frequency of the traveling support device 11. The display device 15 such as a liquid crystal touch panel display serves as a presentation portion which presents support guidance. The control portion 30 controls display contents of the display device 15.

The control portion 30 has a function of controlling the display device 15 to present the support guidance of the serviceable traveling support device based on the use frequency of the serviceable traveling support device determined by the support device determining portion 13.

In the embodiment, the control portion 30 is configured as a computer including a CPU 31, an RAM 32, and an ROM 33. The control portion 30 controls the display contents of the display device 15. Specifically, the control portion 30 changes the support guidance presented by the display device 15 in accordance with the use frequency determined by the use frequency determining portion 14. The traveling support device 11 can be subjected to setting operation by the driver. The support guidance presented by the display device 15 shows contents for inquiring whether to use the serviceable traveling support device or not, contents for urging the driver to use the serviceable traveling support device, an operation procedure, etc., when one of the traveling support devices 11 is used. Here, the support guidance is displayed by images and characters. That is, presentation of the support guidance on the presentation portion means display of the operation procedure etc. on the display device 15 by the images or characters.

In the vehicle 1 provided with such a vehicle traveling support control apparatus 10, the traveling environment of the vehicle 1 is determined by the traveling environment determining portion 12, a serviceable one of the traveling support devices 11 is determined in accordance with the determined traveling environment by the support device determining portion 13, and the support guidance of the serviceable traveling support device 11 is presented through the display device 15 based on the use frequency of the determined serviceable traveling support device 11 so that the contents of the support guidance can vary according to a proficiency level correlated with the driver's use frequency.

Thus, in the embodiment, the traveling support device 11 selected suitably for the traveling environment and in consideration of driver's thought or the driver's use frequency is guided to the driver. Accordingly, it is possible to reduce a driving burden to improve drivability, and it is possible to contribute to preventive safety.

Next, a specific configuration about the vehicle traveling support control apparatus 10 will be described.

The vehicle 1 has a traveling distance detecting portion 26 for detecting a traveling distance T. When the traveling distance T detected by the traveling distance detecting portion 26 has reached and goes beyond a predetermined distance T1 stored and set in advance in the ROM 33, the control portion 30 displays the support guidance of the serviceable traveling support device 11 on the display device 15 in order to present the support guidance to the driver. This reason is as follows. For example, assume that a driver has driven the vehicle 1 since he/she purchased it as a new car. In this case, it is estimated that the use frequency of the traveling support device 11 mounted in the vehicle 1 is low and the proficiency level for operating the traveling support device 11 is also low. Therefore, when, for example, the predetermined distance T1 is set at 1,000 km, the support guidance had better be presented to the driver after the traveling distance T reaches 1,000 km. It is believed that this way does not impose a burden on the driver.

In the embodiment, driver's preference (liking) or the proficiency level for using or operating the traveling support device 11, etc. is determined by the use frequency determining portion 14. The control portion 30 has a function of changing the support guidance displayed on the display device 15 based on a determination result determined by the use frequency determining portion 14. The control portion 30 stores a number N of times of use of the serviceable traveling support device 11 determined by the support device determining device 13, into the ROM 33 whenever the traveling support device 11 is used. When the stored number N of times of use is equal to or larger than a predetermined number of times (equal to or larger than N1) stored and set in advance in the ROM 33, the control portion 30 controls the display device 15 to display, as the support guidance, the contents (e.g. FIG. 6) for inquiring whether to use the serviceable traveling support device 11 determined by the support device determining portion 13 or not. On the other hand, when the number N of times of use of the serviceable traveling support device 11 determined by the support device determining portion 13 is smaller than the predetermined number N1 of times of setting, the control portion 30 controls the display device 15 to display, as the support guidance, the contents (e.g. FIGS. 7A to 7C or FIGS. 8A to 8D) for urging the driver to use at least the serviceable traveling support device 11 determined by the support device determining portion 13.

That is, in the embodiment, when the number N of times of use of the traveling support device 11 is large, the proficiency level for the operation procedure etc. of the traveling support device 11 is regarded as high. On the other hand, when the number N of times of use of the traveling support device 11 is small or zero, the proficiency level for the operation procedure etc. of the traveling support device 11 is regarded as low.

The vehicle 1 is provided with a navigation system 60. The navigation system 60 has a function of displaying map information stored in a recording medium, as an electronic map on the display device 15, and a well-known function of displaying the position of the driver's own vehicle obtained based on an arrival time of an electrical wave from a GPS satellite or a traveling route up to a destination on the displayed electronic map. From the position of the driver's own vehicle obtained from the GPS satellite and the map information, the navigation system 60 can determine whether the driver's own vehicle is traveling on a toll road or not.

The vehicle traveling support control apparatus 10 uses whether the driver's own vehicle is traveling on a toll road or not based on the position information of the navigation system 60, as one of determination conditions used by the traveling environment determining portion 12. Although the display device 15 is used also as a display device of the navigation system 60 here, a display device used for navigation may be provided separately.

The vehicle 1 may be provided with an ETC communication device 70 for using an ETC card. The ETC communication device 70 is a well-known device for making communication with ETC antennas provided in an entrance and an exit of each toll road and automatically receiving a charge. The vehicle traveling support control apparatus 10 may use whether the vehicle 1 is traveling on a toll road or not based on presence/absence of the communication information with the ETC communication device 70, as one of the determination conditions used by the traveling environment determining portion 12.

The vehicle 1 includes an antenna 27 for making communication with a vehicle information and communication system (commonly called "VICS (Registered Trademark)") and can acquire road traffic jam information from the antenna 27. The control portion 30 controls the display device 15 to operate together with the antenna 27 and the navigation system 60 in order to display the traffic jam information on the electronic map. It is a matter of course that the control portion 30 may control the display device 15 to display the road traffic jam information from the antenna 27 independently. The vehicle traveling support control apparatus 10 uses the road traffic jam information from the antenna 27, as one of the determination conditions used by the traveling environment determining portion 12.

The vehicle 1 includes a weather information detecting portion 28. The weather information detecting portion 28 is a raindrop sensor for detecting raindrops or a snowfall sensor. Not an output from the raindrop sensor but a signal for operating each window wiper mounted in the vehicle 1 may be used as weather information. The vehicle traveling support control apparatus 10 uses an output from the weather information detecting portion 28 as one of the determination conditions used by the traveling environment determining portion 12.

That is, the antenna 27, the weather information detecting portion 28, the navigation system 60, the ETC communication device 70, etc. function as a traveling environment detecting portion 16 for detecting the traveling environment of the vehicle 1.

The traveling environment determining portion 12 determines the traveling environment of the vehicle 1 from the pieces of information detected by the traveling environment detecting portion 16. In the embodiment, the traveling environment serves as determination conditions for determining whether each traveling support device 11 is serviceable or not. Therefore, the traveling environment determining portion 12 also serves as a portion for determining use conditions of the traveling support device 11.

The traveling environment (determination conditions) includes a traveling place of the vehicle 1, a road environment where the vehicle 1 travels, the shape of each road, traffic jam information, weather information, etc., as shown in FIG. 2A.

The traveling place includes a toll road and an urban area as determination items. Whether the vehicle 1 is traveling on the toll road or not can be determined based on toll road information issued from the navigation system 60. Whether the vehicle 1 is traveling on the urban area or not may be determined from the driver's own vehicle position information and the map information of the navigation system 60 or can be determined from presence/absence of the toll road information.

The road environment includes a national road, a prefectural road and a municipal road as determination items. As for determination of these determination items, whether the vehicle 1 is traveling on one of the national road, the prefectural road and the municipal road is determined from the driver's own vehicle position information and the map information of the navigation system 60. The road shape includes a straight line, a curve, a branch, and a tunnel as determination items. These determination items are determined from the driver's own vehicle position information and the map information of the navigation system 60. Whether the vehicle 1 is traveling on the straight line, the curve, the branch or the tunnel may be determined from a direction of each wheel of the vehicle 1 or a steering rotation angle, and the map information etc.

A determination item of the traffic jam state is whether traffic jam has occurred or not. The determination item is determined based on road traffic jam information from the antenna 27. In addition, a method for grasping the traffic jam state by inter-vehicle communication etc. may be used.

The weather information includes sunny, rainy, and snowy as determination items. Whether the vehicle 1 is traveling in a rainy day or traveling in a sunny day can be determined based on presence/absence of an output from the weather information detecting portion 28. For example, when there is no output from the weather information detecting portion 28, it is determined that the vehicle 1 is traveling in the sunny day. When there is an output from the weather information detecting portion 28, it is determined that the vehicle 1 is traveling in the rainy day. Whether the vehicle 1 is traveling on a snowy road or not can be determined from presence/absence of an output from the snowfall sensor as the weather information detecting portion 28. The determination items as such traveling environment determination conditions are stored in advance in the ROM 33.

The traveling environment (determination conditions) varies also according to the traveling support device 11 to be used. Therefore, the traveling environment (determination conditions) corresponding to the kind of the traveling support device 11 may be designed to be additionally stored into the ROM 33, or the traveling environment (determination conditions) corresponding to expected traveling support devices 11 may be stored in advance.

In addition to these pieces of information, data of a screen or characters showing an operation method as the support guidance are stored in the ROM 33. A storage portion may be provided separately from the ROM 33, and the data of the screen or characters showing the operation method as the support guidance may be stored in advance in the storage portion so that the data can be used.

As for the use frequency of the traveling support device 11, the number of times of use is counted up by a counter whenever the traveling support device 11 is used, and the number of times of use is stored in the ROM 33 in association with the traveling support device 11 which has been used.

Various information of the vehicle 1 is displayed by characters or an image on the display device 15. In addition, an operation procedure etc. of an ACC (Adaptive Cruise Control) control device 51 is displayed on the display device 15. The contents displayed on the display device 15 include an ON/OFF state of ACC control, a control state (presence/absence of a preceding vehicle, a set inter-vehicle distance, and speed), etc. In the embodiment, the operation procedure of the ACC control device 51 is displayed as the support guidance on the display device 15 so that the driver can be visually informed of the operation procedure of the ACC control device 51. In addition, the contents displayed on the display device 15 are controlled by the control portion 30 so as to vary according to the driver's proficiency level (use frequency).

Examples of the traveling support devices 11 may include well-known systems such as the well-known ACC (Adaptive Cruise Control) control device 51 which can keep the traveling speed constant or travel following a preceding vehicle, an LKA (Lane Keeping Assist) control device 52 which adds a steering force to keep the traveling lane, etc.

Figure 3:
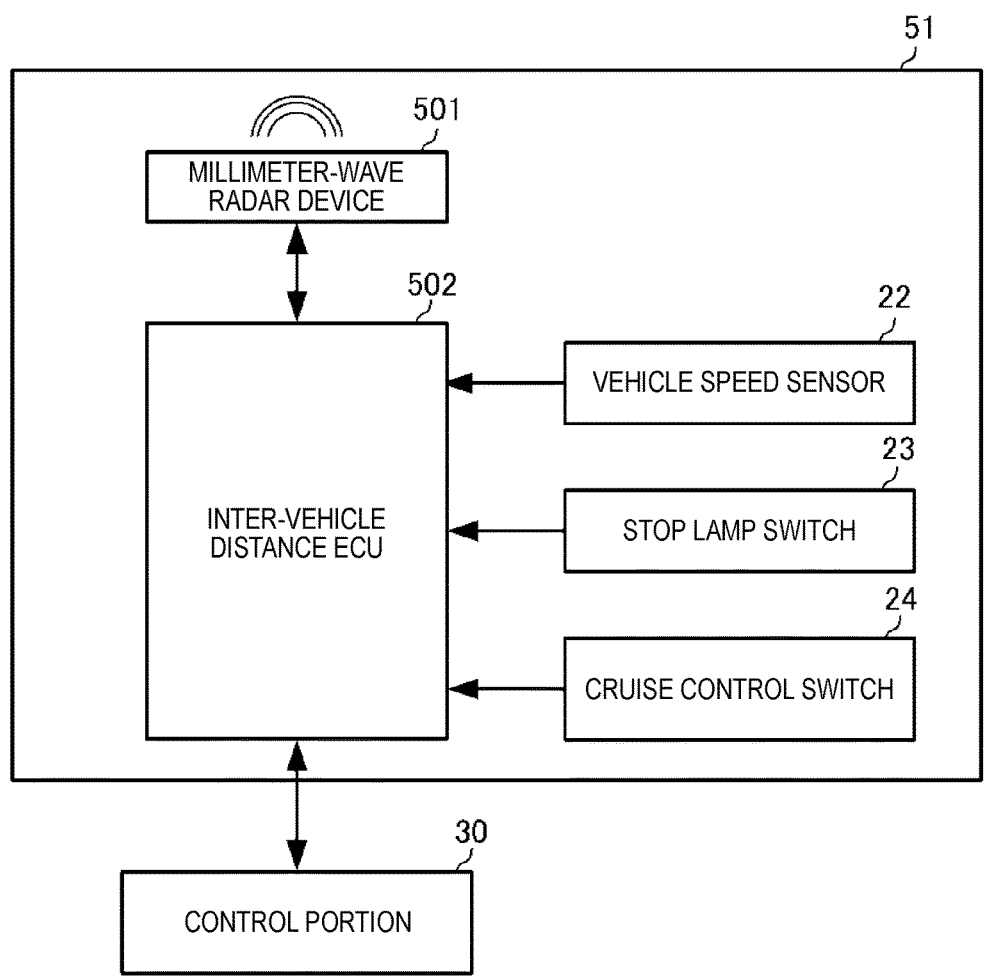
FIG. 3 is a block diagram schematically explaining a form of the traveling support device.

Here, the ACC control device 51 which is one of the traveling support devices 11 will be described. The ACC control device 51 has been already known. Therefore, the function of the ACC control device 51 will be schematically described. FIG. 3 is a view schematically showing the configuration of the ACC control device 51. The ACC control device 51 includes a millimeter-wave radar device 501. The millimeter-wave radar device 501 is a well-known radar device which is disposed, for example, inside a front grill of the vehicle 1 so as to transmit a millimeter wave toward the front of the vehicle and receive the millimeter wave reflected on the preceding vehicle. The millimeter-wave radar device 501 detects a relative distance to the preceding vehicle based on the length of time between the transmission of the millimeter wave and the reception of the transmitted millimeter wave, and detects a relative speed to the preceding vehicle based on a difference in frequency between the transmitted wave and the received wave. Incidentally, the relative distance and the relative speed to the preceding vehicle may be detected not by the millimeter-wave radar device 501 but by a stereo camera etc. constituted by a plurality of cameras.

The ACC control device 51 includes an inter-vehicle control ECU 502. The inter-vehicle control ECU 502 determines whether the preceding vehicle to be followed is present in the lane of the driver's own vehicle or not based on a detection result of the millimeter-wave radar device 501, vehicle speed information detected by a vehicle speed sensor 22 serving as a vehicle speed information detecting portion, a steering angle (curve radius) of the driver's own vehicle, etc. The inter-vehicle control ECU 502 executes ACC control to perform following traveling when the preceding vehicle is present, or to perform constant speed traveling in which the vehicle 1 travels at a set vehicle speed when the preceding vehicle is absent. When the vehicle 1 performs the constant speed traveling, the inter-vehicle control ECU 502 compares the vehicle speed information with the vehicle speed set by the driver and determines a target acceleration and a deceleration gradient.

In the case where the vehicle 1 performs the following traveling, the inter-vehicle control ECU 502 compares the relative distance detected by the millimeter-wave radar device 501, the vehicle speed information, and the set inter-vehicle distance (long distance, middle distance or short distance) set in advance by the user from three stage levels, with respect to the preceding vehicle on which the vehicle 1 should make inter-vehicle control. As a result, the inter-vehicle control ECU 502 determines a target inter-vehicle distance to the preceding vehicle. Incidentally, even when the set inter-vehicle distance is the same, the target inter-vehicle distance can be determined to vary according to the vehicle speed.

The inter-vehicle control ECU 502 determines the target acceleration (in the case where the vehicle 1 shortens the inter-vehicle distance), the deceleration gradient (in the case where the vehicle 1 widens the inter-vehicle distance), and a brake control request (in the case where the deceleration is large) to thereby reach the target inter-vehicle distance. In addition, when the inter-vehicle control ECU 502 has difficulty in performing inter-vehicle control in the case of bad weather etc., the inter-vehicle control ECU 502 generates a warning display request. The target acceleration, the deceleration gradient, the brake control request and the warning display request are hereinafter referred to as "distance control information". The distance control information is transmitted through a CAN communication line etc. which is a communication line mounted in the vehicle 1, and the control portion 30 receives the distance control information if necessary.

The vehicle speed sensor 22 for detecting the vehicle speed of the driver's own vehicle, a stop lamp switch 23 for detecting presence/absence of a brake operation, and a cruise control switch 24 operated by the driver for actuating the ACC control device 51 or cancelling the actuation of the ACC control device 51 are connected to the inter-vehicle control ECU 502.

Upon reception of the distance control information from the inter-vehicle control ECU 502, the control portion 30 outputs a throttle opening degree of an engine mounted in the vehicle 1 or a driving command to an actuator driving unit of a transmission in accordance with a driving state determined from the distance control information. An engine output, a braking force (engine brake) or a transmission shift can be controlled by these actuators so that the target acceleration or the deceleration gradient can be achieved.

Upon reception of the distance control information, particularly, the brake control request, from the inter-vehicle control ECU 502, the control portion 30 controls a brake actuator for controlling opening/closing of a control valve provided in a hydraulic circuit, to thereby request braking of the vehicle 1 so that the target inter-vehicle distance can be obtained. That is, when a sufficient target deceleration cannot be obtained by throttle control or shift-down, a braking request is issued to the vehicle 1.

Figure 4:
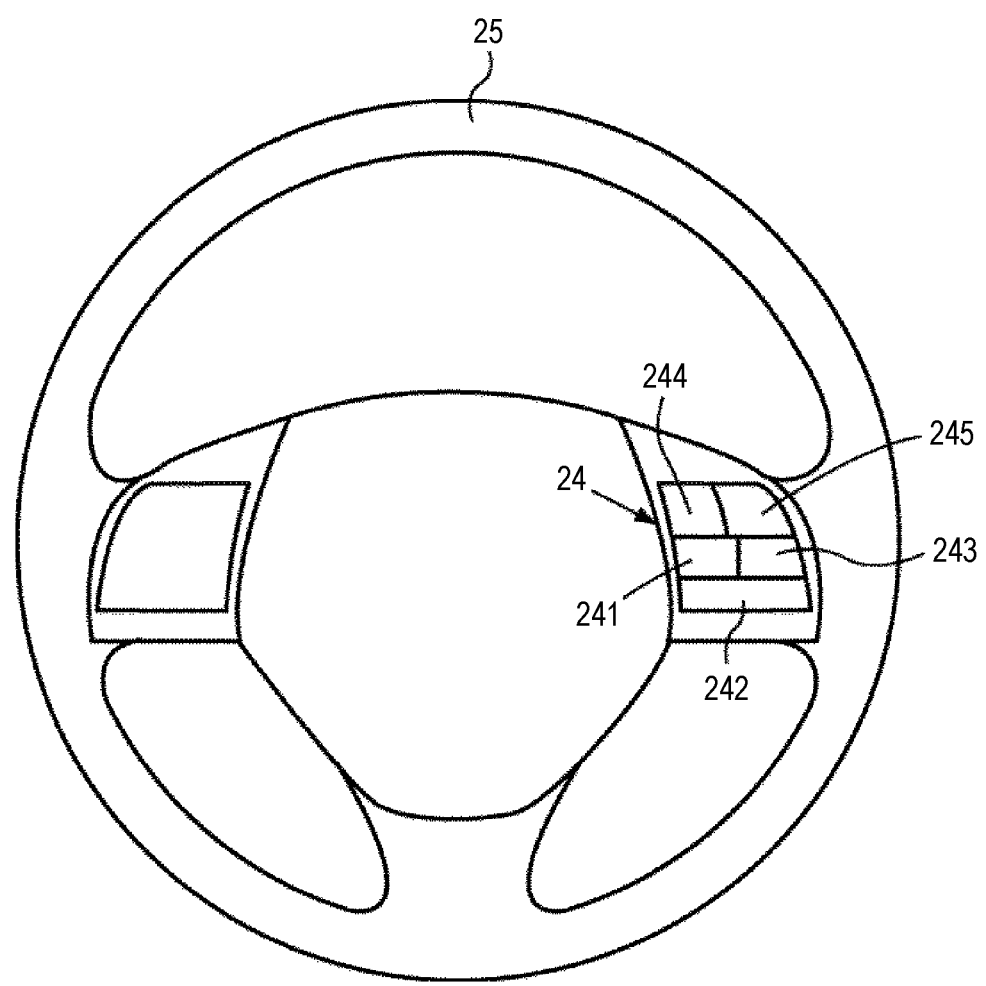
FIG. 4 is a view showing a form of an operating portion for setting the traveling support device.

The cruise control switch 24 serving as an operating portion is constituted by a plurality of push-button type switches disposed in a steering wheel 25, for example, as shown in FIG. 4. That is, the cruise control switch 24 includes a switch 241 for actuating the ACC control device 51, a switch 242 for setting the inter-vehicle distance, a switch 243 for setting cruise vehicle speed, a switch 244 for cancelling the setting or actuation of the ACC control device 51, a switch 245 for determining various operations, etc. The cruise control switch 24 is manually operated by the driver. The control procedure of the cruise control switch 24 is predetermined to some degree. The driver has to learn the operation procedure through a manual etc.

The cruise control switch 24 is limited to the push-button type but may be a lever type. In both of the cases, the operation procedure for actuating or setting the ACC control device 51 has to be learned. Therefore, one driver who frequently uses the ACC control device 51 may remember the operation procedure so that the proficiency level can be said to be high. Another driver who does not frequently use the ACC control device 51 may often remember the operation procedure vaguely so that the proficiency level can be said to be low. Further, a driver may not know the fact that the ACC control device 51 is mounted in the vehicle 1. Therefore, the driver may not know the position where the cruise control switch 24 is disposed or the operation procedure of the cruise control switch 24 so that the proficiency level can be said to be remarkably low.

Figure 5:
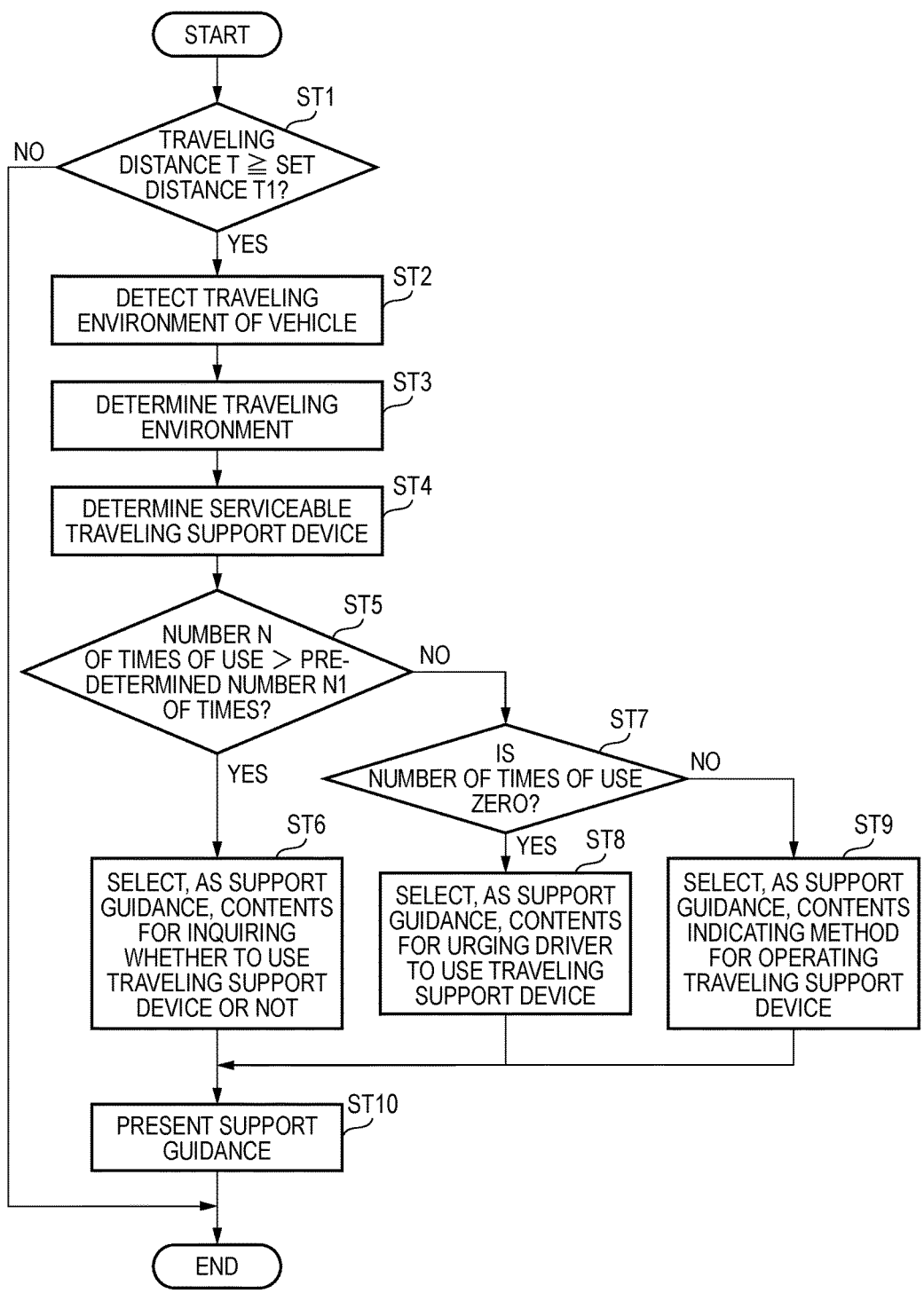
FIG. 5 is a flow chart showing a mode of control for presenting support guidance of the traveling support device.

Next, control contents of the vehicle traveling support control apparatus 10 will be described based on a flow chart shown in FIG. 5.

In a step ST1, the control portion 30 of the vehicle traveling support control apparatus 10 determines whether a traveling distance T detected by the traveling distance detecting portion 26 is equal to or longer than a predetermined distance T1 or not. When it is determined that the traveling distance T is equal to or longer than the predetermined distance T1, the control portion 30 of the vehicle traveling support control apparatus 10 concludes that the timing is proper for support guidance, and goes to a step ST2. In the step ST2, the control portion 30 of the vehicle traveling support control apparatus 10 detects various kinds of traveling environment information by the traveling environment detecting portion 16. Then, the control portion 30 of the vehicle traveling support control apparatus 10 goes to a step ST3. In the step ST3, the control portion 30 of the vehicle traveling support control apparatus 10 controls the traveling environment determining portion 12 to execute a traveling environment properness determining process so as to determine whether the traveling environment is proper for using any of the traveling support devices 11 or not. The contents of the traveling environment properness determining process are the same as those described in FIG. 2A. After these traveling environment conditions are determined by the traveling environment determining portion 12, the control portion 30 of the vehicle traveling support control apparatus 10 goes to a step ST4 to select and determine a serviceable traveling support device from the traveling support devices 11 based on the traveling conditions determined in the step ST3. Here, assume that the ACC control device 51 is determined, for example, as shown in FIG. 2B.

In a step ST5, the control portion 30 of the vehicle traveling support control apparatus 10 controls the use frequency determining portion 14 to compare a number N of times of use stored in the ROM 33 as the use frequency of the ACC control device 51 serving as the serviceable traveling support device 11, with a predetermined number N1 of times stored in the ROM 33 and determine a result of the comparison. When it is determined by the use frequency determining portion 14 that the number N of times of use is equal to or larger than the predetermined number N1 of times, the control portion 30 of the vehicle traveling support control apparatus 10 concludes that the use frequency is high, and goes to a step ST6. On the other hand, when it is determined by the use frequency determining portion 14 that the number N of times of use is smaller than the predetermined number N1 of times, the control portion 30 of the vehicle traveling support control apparatus 10 concludes that the use frequency is low, and goes to a step ST7.

That is, when it is determined in the step ST5 that the number N of times of use is equal to or larger than the predetermined number N1 of times, the control portion 30 of the vehicle traveling support control apparatus 10 regards the driver as a driver who is high in proficiency level and who remembers operation of the cruise control switch 24 of the ACC control device 51 which is the determined traveling support device, and goes to the step ST6. On the other hand, when it is determined that the number N of times of use is smaller than the predetermined number N1 of times, the control portion 30 of the vehicle traveling support control apparatus 10 regards the driver as a driver who is low in proficiency level and who does not well know or does not know at all operation of the cruise control switch 24 which is an operating portion of the ACC control device 51 serving as the selected traveling support device, and goes to the step ST7.

Figure 6:
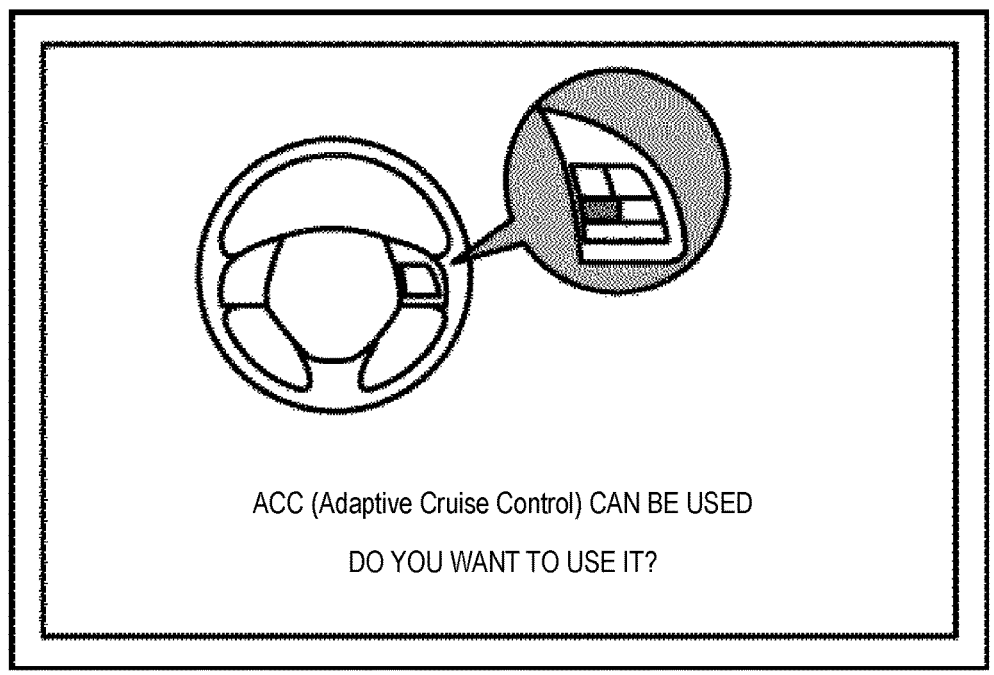
FIG. 6 is a view showing an example of a screen as the support guidance presented when the proficiency level is high.

The control portion 30 presents the support guidance in accordance with the use frequency in the step ST6. However, in this case, the control portion 30 selects not the operation procedure but a guidance image for inquiring whether to use the serviceable traveling support device or not, as shown in FIG. 6, and displays the selected guidance image on the display device 15 to visually present the guidance image to the driver in a step S10.

Figure 7A:
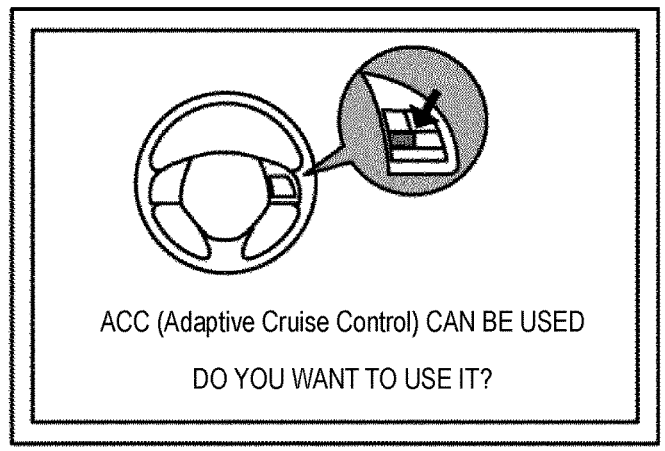
FIGS. 7A to 7C are views showing examples of screens as the support guidance presented when the proficiency level is low.
Figure 7B:
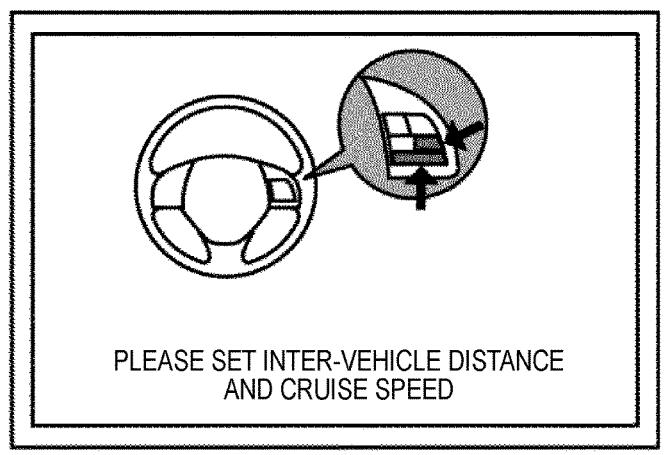
Figure 7C:
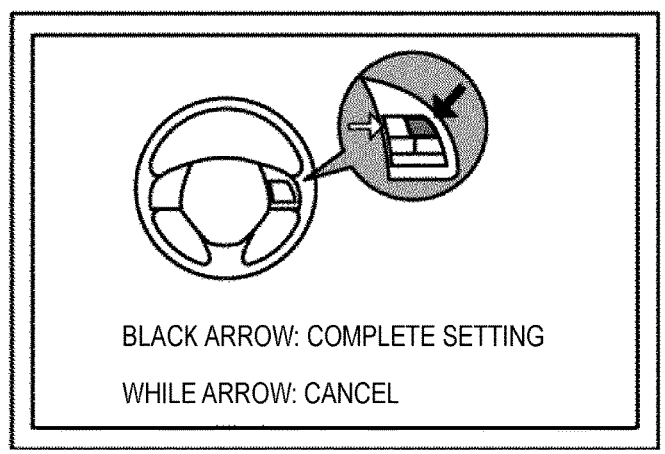
Figure 8A:
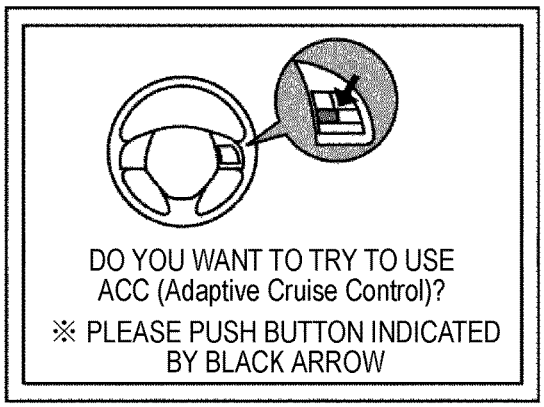
FIGS. 8A to 8D are views showing examples of screens as the support guidance presented when the proficiency level is low and use experience is zero.
Figure 8B:
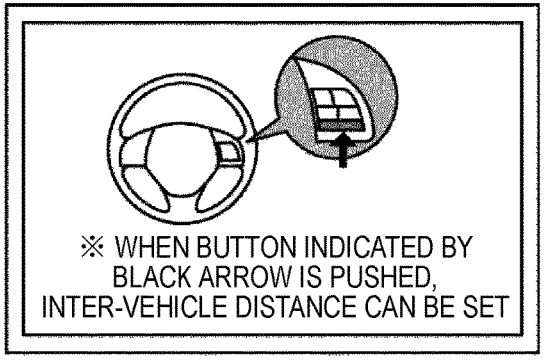
Figure 8C:
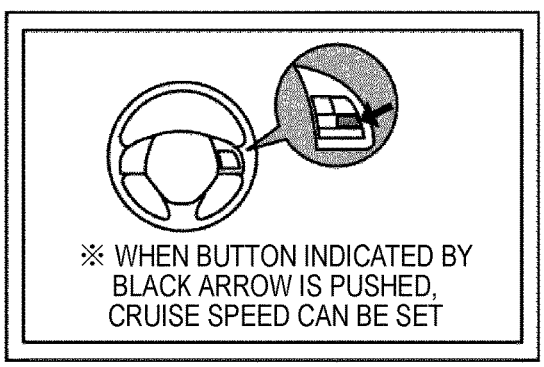
Figure 8D:
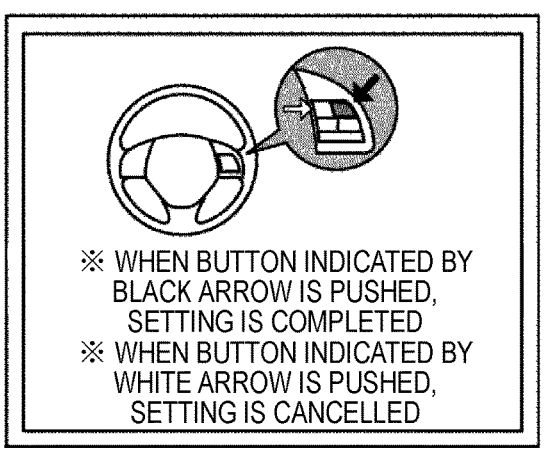

In the step ST7, the control portion 30 controls the use frequency determining portion 14 to determine whether the number N of times of use is zero or not. When it is determined that the number N of times of use is not zero here, the control portion 30 regards the driver as a driver who is low in use frequency of the traveling support device and low in proficiency level. The control portion 30 therefore goes to a step ST9 to select one of images indicating operation contents of the ACC control device 51 which is a serviceable traveling support device, as shown in FIG. 7A to 7C. Then, the control portion 30 goes to a step ST10, in which whenever an operation instructed on each screen on the display device 15 is performed, the screen is changed to another to visually present the support guidance to the driver.

On the other hand, when it is determined in the step ST7 that the number N of times of use is zero, the control portion 30 regards the driver as a driver who has never used the traveling support device 11 or does not know how to use the traveling support device 11. The control portion 30 therefore goes to a step ST8 to select one of images indicating contents for urging the driver to use the ACC control device 51 which is a serviceable traveling support device, and operation contents of the ACC control device 51, as shown in FIGS. 8A to 8D. Then, the control portion 30 goes to the step ST10, in which whenever an operation instructed on each screen on the display device 15 is performed, the screen is changed to another to visually present the support guidance to the driver.

According to the embodiment, the support guidance about the serviceable traveling support device (e.g. the ACC control device 51) determined by the support device determining portion 13 can be presented to the driver based on the use frequency of the serviceable traveling support device 11. Accordingly, the traveling support device can be guided to the driver suitably for the traveling environment and in consideration of the driver's preference or use frequency. It is possible to reduce a driving burden to improve drivability and it is possible to contribute to preventive safety.

In the embodiment, when the traveling distance T of the vehicle 1 detected by the traveling distance detecting portion 26 is equal to or longer than (has reached and goes beyond) the predetermined distance T1, the support guidance of the serviceable traveling support device is presented to the driver. Accordingly, after the driver has grasped the kind of the traveling support device, the position of the cruise control switch 24 which is an operating portion, etc., the driver can see the support guidance. Therefore, it is possible to reduce the driving burden more greatly to improve drivability and it is possible to contribute to preventive safety.

In the embodiment, the support guidance displayed on the display device 15 is changed in accordance with the use frequency determined by the use frequency determining portion 14. Accordingly, it is possible to perform suitable support guidance in accordance with the driver's proficiency level for setting operation. That is, the number N of times of use is counted and stored for determining the use frequency. When the stored number N of times of use is equal to or larger than the set predetermined number N1 of times, the driver is regarded as high in proficiency level. In this case, not the operation procedure but more simple contents are displayed. That is, contents for inquiring whether to use the serviceable traveling support device are displayed. Therefore, a driver who is high in proficiency level doesn't feel annoyed, and hence the driver can be prevented from forgetting to make setting of the traveling support device 11. It is possible to improve drivability more greatly and it is possible to contribute to preventative safety more greatly.

On the other hand, in the case where the number N of times of use is smaller than the set predetermined number N1 of times, the driver is regarded as low in proficiency level. Therefore, the contents for urging the driver to use the serviceable traveling device or the operation procedure of the serviceable traveling device is displayed as the support guidance on the display device 15. Therefore, the driver who is low in proficiency level and who does not know how to operate and hesitates to use the traveling support device 11 can feel easy to perform operation or setting for using the traveling support device. Accordingly, it is possible to improve drivability more greatly and it is possible to contribute to preventive safety.

Although the ACC control device 51 is illustrated as the traveling support device in the aforementioned embodiment, the LKA (Lane Keeping Assist) control device 52 etc. for adding a steering force to keep the traveling lane is cited as another traveling support device. The LKA control device 52 also serves as one of the traveling support devices which the driver can operate or set. A support screen corresponding to the LKA control device 52 or conditions for determining whether the LKA control device 52 can be serviceable or not are stored in advance in the ROM 33. In this manner, when the traveling environment of the vehicle can make the LKA control device 52 serviceable, it may be determined that the LKA control device 52 is the serviceable traveling support device so that the support screen corresponding to the LKA control device 52 can be displayed on the display device 15 and presented to the driver in accordance with use frequency of the LKA control device 52.

In addition, it can be assumed that some traveling support devices 11 may be mounted not at the time of factory shipment but as options by a dealer etc. Accordingly, a support screen corresponding to each of these traveling support devices to be added and conditions for determining whether the traveling support device can be serviceable or not may be set in advance in the ROM 33 or may be additionally written into the ROM 33 afterward.

Although the preferable embodiment of the invention has been described above, the invention is not limited to such a specific embodiment. As long as there is no particular limit in the aforementioned description, the invention can be modified and changed variously within the scope of the gist of the invention described in Claims. For example, the display device 15 is illustrated as the presentation portion and designed to display an image as the support guidance to thereby present the support guidance to the driver. However, display of the image may be replaced by a voice presentation system which generates and presents voice to perform support guidance.

For example, a system having a well-known configuration including a voice input portion which inputs driver's voice, an automatic voice recognizing portion (ASR) which recognizes the voice inputted by the voice input portion, a language understanding portion such as natural language understanding (NLU) which determines the meaning of the voice recognized by the automatic voice recognizing portion, a synthetic voice portion, etc. can be used as the voice presentation system. When the sound presentation portion and the control portion 30 are connected by a signal line and cooperated with each other, the serviceable traveling support device 11, an operation method of the traveling support device 11, etc. may be guided to the driver by voice, and the same signal as that in a case where the operating portion is operated manually may be outputted by a driver's voice command. In addition, both the support guidance performed by voice generated by the voice presentation system and display performed by the display device 15 may be used so that whether to use the traveling support device 11 or not, or operation contents of the traveling support device 11, etc. can be presented to the driver.

Most suitable effects which can be generated from the invention are merely cited as the effects described in the embodiment of the invention. However, effects which can be achieved by the invention are not limited to those described in the embodiment of the invention.

What is claimed is:

1. A vehicle traveling support control apparatus comprising:
    a traveling environment determining portion that determines a traveling environment of a vehicle;
    a support device determining portion that determines a serviceable traveling support device from one or more traveling support devices mounted in the vehicle in accordance with the traveling environment determined by the traveling environment determining portion;
    a presentation portion that presents support guidance of the serviceable traveling support device;
    a control portion that controls the presentation portion to present the support guidance of the serviceable traveling support device based on a use frequency of the serviceable traveling support device determined by the support device determining portion; and
    a use frequency determining portion that determines the use frequency of the traveling support device by counting a number of times that the serviceable traveling support device is used,
    wherein the control portion changes the support guidance presented by the presentation portion when the counted number of times is equal to or larger than a predetermined number of times, and
    wherein the supporting guidance displayed, when the counted number is equal to or larger than the predetermined number of times, is more simple than the supporting guidance displayed when the counted number of times is smaller than the predetermined number of times.

2. The vehicle traveling support control apparatus according to claim 1 further comprising:
    a traveling distance detecting portion which detects a traveling distance of the vehicle,
    wherein the control portion controls the presentation portion to present the support guidance of the serviceable traveling support device in a case where the traveling distance detected by the traveling distance detecting portion is larger than a predetermined distance.

3. The vehicle traveling support control apparatus according to claim 1, wherein the control portion controls the presentation portion to present, as the support guidance, contents for inquiring whether to use the serviceable traveling support device determined by the support device determining portion or not when the use frequency is equal to or larger than the predetermined number of times which has been set in advance.

4. The vehicle traveling support control apparatus according to claim 3, wherein the control portion selects inquiring the driver whether to use the serviceable traveling support device when the use frequency is equal to or larger than the predetermined number of times.

5. The vehicle traveling support control apparatus according to claim 1, wherein the control portion controls the presentation portion to present, as the support guidance, contents for urging a user to use at least the serviceable traveling support device determined by the support device determining portion when the use frequency is smaller than the predetermined number of times which has been set in advance.

6. The vehicle traveling support control apparatus according to claim 5, wherein the control portion selects one of urging the driver to use the serviceable traveling support device and indicating a method of operating the serviceable traveling support device when the use frequency is smaller than the predetermined number of times.

7. The vehicle traveling support control apparatus according to claim 6 wherein the control portion selects urging the driver to use the serviceable traveling support device when the user frequency is zero.

8. The vehicle traveling support control apparatus according to claim 1, wherein the serviceable traveling support device includes an adaptive cruise control device that at least one of automatically controls a traveling speed of the vehicle constant and automatically controls a distance from a preceding vehicle.

9. The vehicle traveling support control apparatus according to claim 1, wherein the serviceable traveling support device includes a lane keeping assist device that controls a steering force to keep the vehicle between traveling lanes.

* * * * *